(12) United States Patent
Park et al.

(10) Patent No.: US 9,490,943 B2
(45) Date of Patent: Nov. 8, 2016

(54) METHOD FOR RECEIVING OR TRANSMITTING DOWNLINK SIGNAL AND APPARATUS FOR SAME

(71) Applicant: LG ELECTRONICS INC., Seoul (KR)

(72) Inventors: Jonghyun Park, Anyang-si (KR); Kijun Kim, Anyang-si (KR); Illsoo Sohn, Anyang-si (KR); Eunsun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 82 days.

(21) Appl. No.: 14/378,841

(22) PCT Filed: Feb. 21, 2013

(86) PCT No.: PCT/KR2013/001380
§ 371 (c)(1),
(2) Date: Aug. 14, 2014

(87) PCT Pub. No.: WO2013/125872
PCT Pub. Date: Aug. 29, 2013

(65) Prior Publication Data
US 2015/0029972 A1    Jan. 29, 2015

Related U.S. Application Data

(60) Provisional application No. 61/601,539, filed on Feb. 21, 2012.

(51) Int. Cl.
*H04W 4/00* (2009.01)
*H04L 1/18* (2006.01)

(52) U.S. Cl.
CPC ........... *H04L 1/1896* (2013.01); *H04L 1/1812* (2013.01)

(58) Field of Classification Search
CPC . H04W 28/04; H04W 72/04; H04W 72/042; H04W 88/08; H04L 5/0007
See application file for complete search history.

(56) References Cited

U.S. PATENT DOCUMENTS 7,515,562 B2 *   4/2009   Lim .................... H04W 28/26
                                                  370/331
7,917,145 B2 *   3/2011   Mahany ................ H04L 45/18
                                                  455/435.1

(Continued)

FOREIGN PATENT DOCUMENTS

JP    2011-142498 A    7/2011
KR    10-2010-0032346 A    3/2010

(Continued)

*Primary Examiner* — Melvin Marcelo
*Assistant Examiner* — Sanjay K Dewan
(74) *Attorney, Agent, or Firm* — Birch, Stewart, Kolasch & Birch, LLP

(57) ABSTRACT

The method for receiving a downlink signal in a wireless communication system, according to one embodiment of the present invention, comprises: receiving, from a base station, a candidate seed list and downlink control information for the generation of a sequence of a downlink demodulation reference signal, wherein a seed value is selected from the candidate seed list on the basis of seed value indicating information contained in the downlink control information and the sequence of the downlink demodulation reference signal is generated by using the selected seed value. The candidate seed list may include a plurality of hybrid automatic repeat request (HARQ) process identifiers and virtual cell identifiers related to the plurality of HARQ process identifiers.

12 Claims, 11 Drawing Sheets

(56) References Cited

U.S. PATENT DOCUMENTS

| | | |
|---|---|---|
| 2010/0067512 A1 | 3/2010 | Nam et al. |
| 2010/0195599 A1 | 8/2010 | Zhang et al. |
| 2010/0315989 A1 | 12/2010 | Reznik et al. |
| 2012/0176884 A1* | 7/2012 | Zhang .................. H04B 7/024 370/203 |
| 2013/0077523 A1* | 3/2013 | Ko ....................... H04W 24/00 370/252 |

FOREIGN PATENT DOCUMENTS

| | | |
|---|---|---|
| KR | 10-2011-0124755 A | 11/2011 |
| WO | WO 2010/147853 A2 | 12/2010 |

\* cited by examiner

FIG. 6
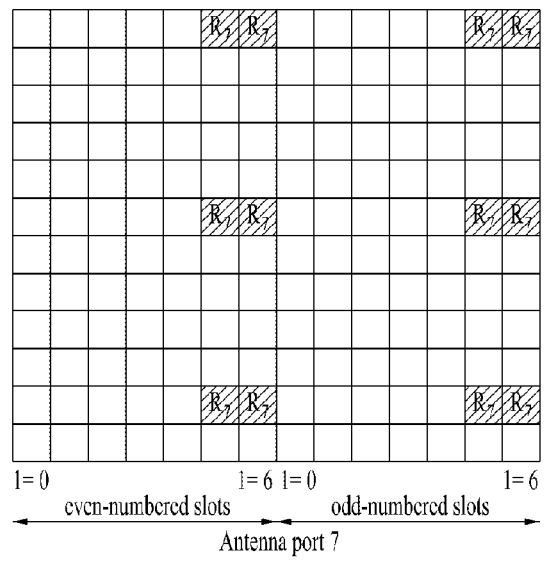
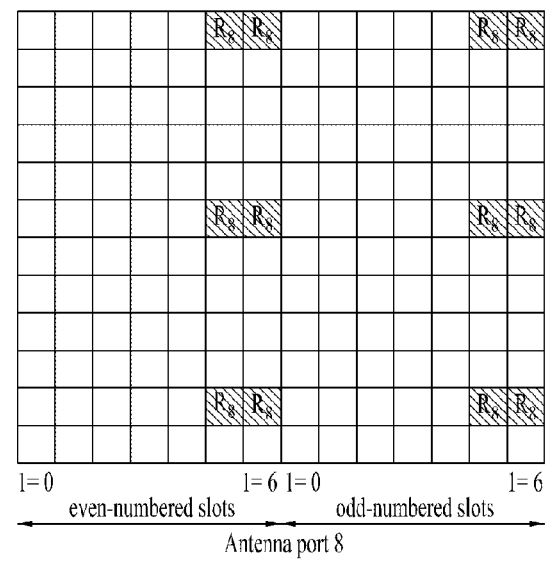
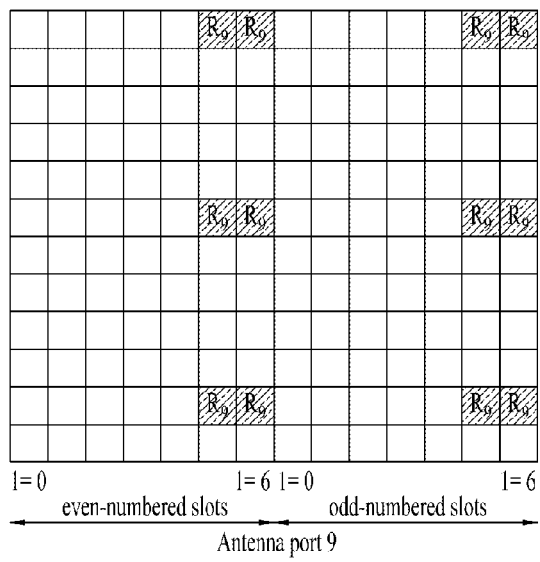
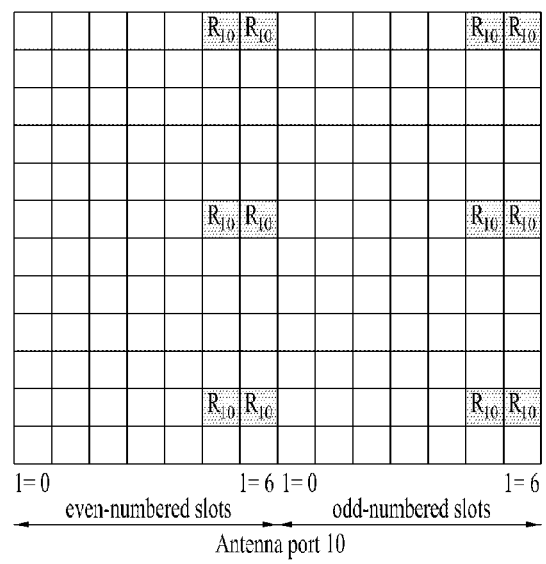

METHOD FOR RECEIVING OR TRANSMITTING DOWNLINK SIGNAL AND APPARATUS FOR SAME

TECHNICAL FIELD

The present invention relates to a method and apparatus for receiving or transmitting a downlink signal in a wireless communication system.

BACKGROUND ART

With the advent and propagation of various devices such as smartphones, tablet PCs, etc. and technologies which require machine-to-machine (M2M) communication and high data throughput, the quantity of data that needs to be processed in a cellular network has rapidly increased. To satisfy rapidly increasing data throughput, carrier aggregation, cognitive radio technology, etc. for efficiently using a wider frequency band and multiple-input multiple-output (MIMO), cooperative multi-point (CoMP), etc. for increasing data throughput within a limited frequency band have been developed. Furthermore, communication environments are evolved such that the density of nodes which can be accessed by a user equipment (UE) increases. A node refers to a fixed point including one or more antennas and capable of transmitting/receiving radio signals to/from a UE. A communication system including high-density nodes can provide high performance communication services to UEs according to cooperation between nodes.

CoMP communication in which a plurality of nodes communicates with a UE using the same time-frequency domain has data throughput much higher than that of a conventional communication scheme in which each node operates as an independent base station (BS) to perform communication with a UE without cooperation.

A multi-node system performs cooperative communication using plural nodes each of which operates as a BS, access point, antenna, antenna group, radio remote header (RRH) or radio remote unit (RRU). The plural nodes are spaced apart from one another by a predetermined distance or more in the multi-node system, unlike a conventional centralized antenna system in which antennas are concentrated in a BS. The plural nodes can be managed by one or more BSs or BS controllers which control operation of each node or schedule data to be transmitted/received through each node. Each node is connected to a BS or a BS controller which manages the corresponding node via a cable or a dedicated line.

The multi-node system can be regarded as a MIMO system since distributed nodes can communicate with one or more UEs by simultaneously transmitting/receiving different streams. However, in the multi-node system, a transmission area that needs to be covered by each antenna is reduced, compared to an area covered by each antenna included in the conventional centralized antenna system, because signals are transmitted using nodes distributed in a plurality of locations. Accordingly, the multi-node system can reduce power necessary for each antenna to transmit a signal compared to a conventional centralized antenna system employing MIMO. Furthermore, a transmission distance between an antenna and a UE is reduced and thus path loss is decreased and fast data transmission is enabled. Therefore, throughput and power efficiency of a cellular system can be improved and communication performance with relatively uniform quality can be satisfied irrespective of the position of a UE in a cell. In addition, in the multi-node system, BSs or BS controllers connected to plural nodes cooperatively transmit/receive data so as to reduce signal loss during signal transmission. Moreover, when nodes spaced apart from one another perform cooperative communication with a UE, inter-antenna correlation and interference are reduced. Therefore, according to the CoMP communication scheme, a high signal-to-interference-plus-noise ratio (SINR) can be obtained.

Owing to the above-mentioned advantages of the multi-node system, the multi-node system replaces the conventional centralized antenna system or is employed along with the centralized antenna system as a new cellular communication system in order to reduce BS establishment costs and backhaul network maintenance costs in next-generation mobile communication systems, extend service coverage and increase channel capacity and SINR.

DISCLOSURE

Technical Problem

An object of the present invention is to provide a method for dynamically allocating or indicating a seed value used to generate a sequence for a reference signal (RS).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving a downlink signal in a wireless communication system, which is performed by a user equipment (UE), including: receiving a candidate seed list and downlink control information (DCI) for generating a sequence of a downlink demodulation reference signal (DM RS) from a base station (BS), selecting a seed value from the candidate seed list based on seed value indication information contained in the downlink control information (DCI), and generating the sequence of the downlink demodulation reference signal (DM RS) using the selected seed value, wherein the candidate seed list includes a plurality of hybrid automatic repeat request (HARQ) process identifiers and a virtual cell identifiers associated with the plurality of HARQ process identifiers.

Preferably, the seed value indication list may be one of the HARQ process identifiers.

Preferably, the HARQ process identifiers contained in the candidate seed list may correspond to a respective one of virtual cell identifiers.

Preferably, at least two identifiers from among the HARQ process identifiers contained in the candidate seed list may correspond to a specific virtual cell identifier.

Preferably, the selecting the one seed value from the candidate seed list may include: if all HARQ process identifiers related to a specific virtual cell identifier are allocated so that the specific virtual cell identifier is no longer allocated to the UE, selecting one seed value from among the candidate seed list on the basis of seed value indication auxiliary information contained in the downlink control information (DCI).

Preferably, the seed value indication auxiliary information may include scrambling identity information.

In accordance with another aspect of the present invention, a method for transmitting a downlink signal in a wireless communication system, which is performed by an eNodeB (enhanced Node B), includes: transmitting a candidate seed list and downlink control information (DCI) for generating a sequence of a downlink demodulation reference signal (DM RS) to a user equipment (UE), wherein the user equipment (UE) selects a seed value from the candidate seed list based on seed value indication information contained in the downlink control information (DCI), and generates the sequence of the downlink demodulation reference signal (DM RS) using the selected seed value, wherein the candidate seed list includes a plurality of hybrid automatic repeat request (HARQ) process identifiers and virtual cell identifiers associated with the plurality of HARQ process identifiers.

In accordance with another aspect of the present invention, a user equipment (UE) configured to receive a downlink signal in a wireless communication system includes: a radio frequency (RF) unit; and a processor configured to control the RF unit, wherein the processor is configured to receive a candidate seed list and downlink control information (DCI) for generating a sequence of a downlink demodulation reference signal (DM RS) from a base station (BS) through the RF unit, select a seed value from the candidate seed list based on seed value indication information contained in the downlink control information (DCI), and generate the sequence of the downlink demodulation reference signal (DM RS) using the selected seed value, wherein the candidate seed list includes a plurality of hybrid automatic repeat request (HARQ) process identifiers and virtual cell identifiers associates with the plurality of HARQ process identifiers.

Preferably, the seed value indication list may be one of the HARQ process identifiers.

Preferably, the HARQ process identifiers contained in the candidate seed list may correspond to respective one of the virtual cell identifiers.

Preferably, at least two identifiers from among the HARQ process identifiers contained in the candidate seed list may correspond to a specific virtual cell identifier.

Preferably, when the processor selects a seed value from the candidate seed list, if all HARQ process identifiers associated with a specific virtual cell identifier are allocated so that the specific virtual cell identifier is no longer allocated to the UE, the processor may select a seed value from the candidate seed list further based on seed value indication auxiliary information contained in the downlink control information (DCI).

Preferably, the seed value indication auxiliary information may include scrambling identity information.

In accordance with another aspect of the present invention, a base station (BS) configured to transmit a downlink signal in a wireless communication system includes: a radio frequency (RF) unit; and a processor configured to control the RF unit, wherein the processor transmits a candidate seed list and downlink control information (DCI) for generating a sequence of a downlink demodulation reference signal (DM RS) to a user equipment (UE) through the RF unit, wherein the user equipment (UE) selects a seed value from among the candidate seed list based on seed value indication information contained in the downlink control information (DCI), and generates the sequence of the downlink demodulation reference signal (DM RS) using the selected seed value, wherein the candidate seed list may include a plurality of hybrid automatic repeat request (HARQ) process identifiers and virtual cell identifiers associated with the plurality of HARQ process identifiers.

It is to be understood that both the foregoing general description and the following detailed description of the present invention are exemplary and explanatory and are intended to provide further explanation of the invention as claimed.

Advantageous Effects

As is apparent from the above description, the embodiments of the present invention can efficiently receive a downlink signal.

The embodiments of the present invention can efficiently generate a sequence for a downlink reference signal (DMRS).

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 6 exemplarily shows mapping patterns of a demodulation reference signal (DMRS) according to antenna ports.

BEST MODE

Figure 1:
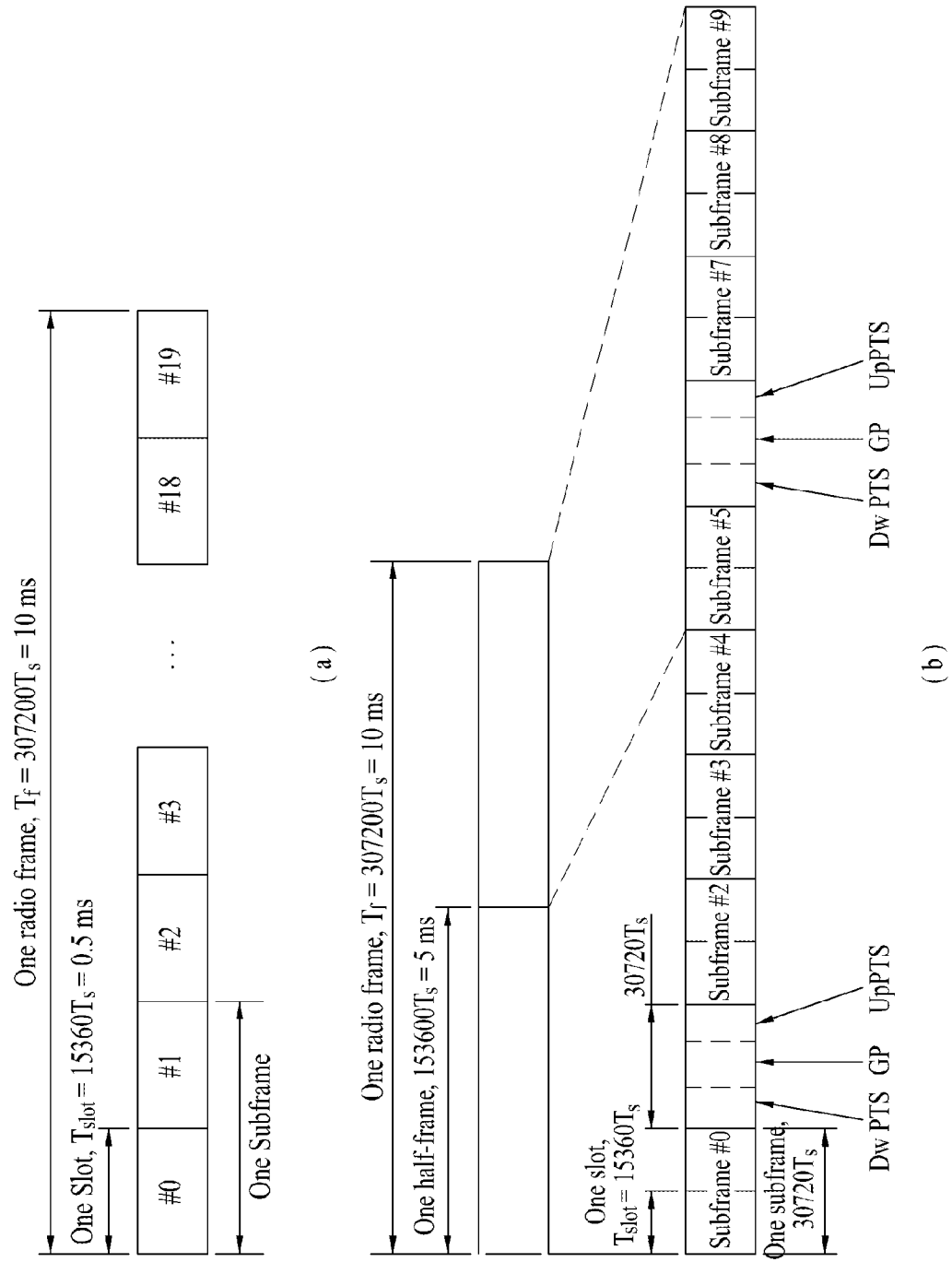
FIG. 1 exemplarily shows a radio frame structure for use in a wireless communication system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

FIG. 1 illustrates an exemplary radio frame structure used in a wireless communication system. FIG. 1($a$) illustrates a frame structure for frequency division duplex (FDD) used in 3GPP LTE/LTE-A and FIG. 1($b$) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
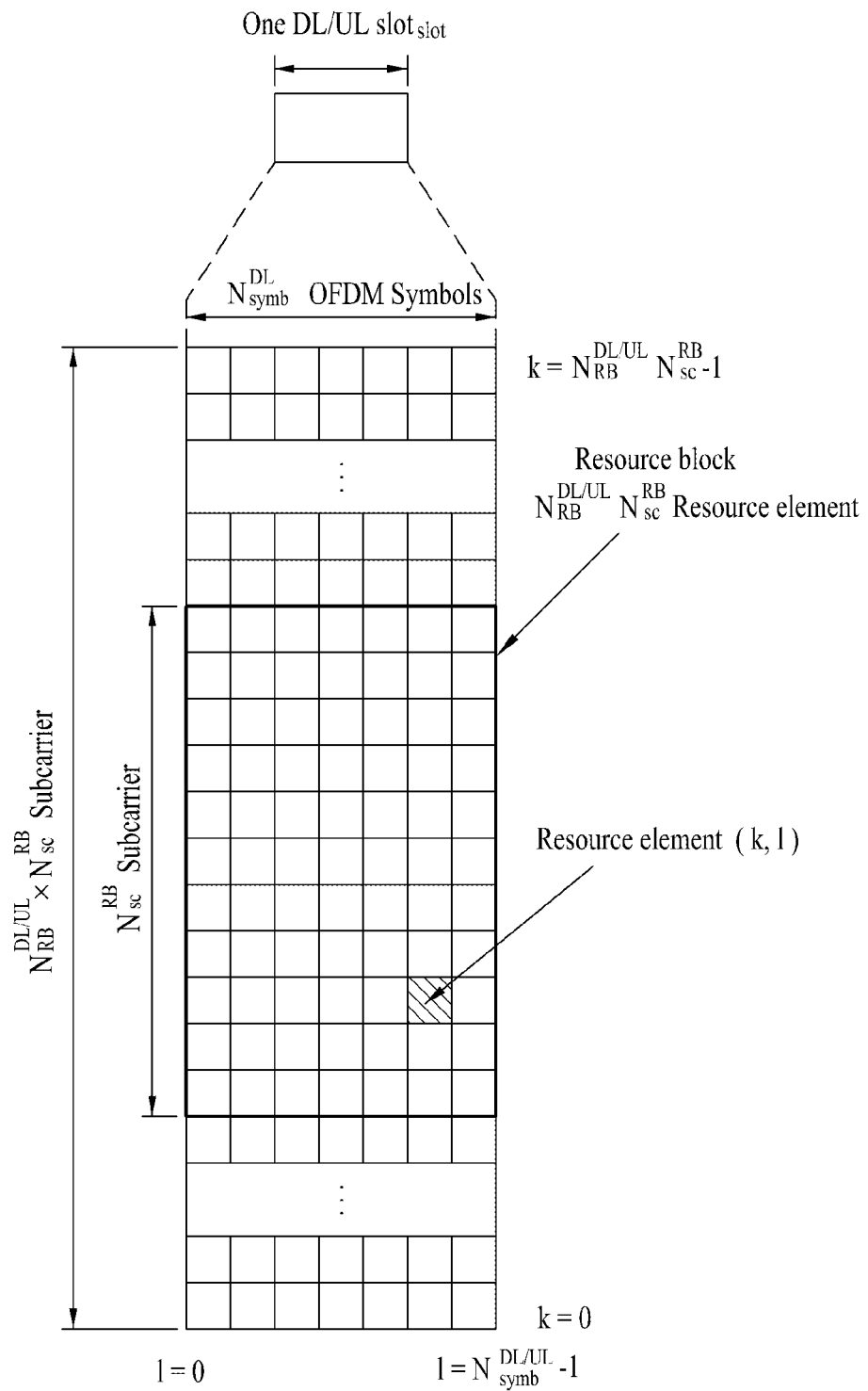
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $NL_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
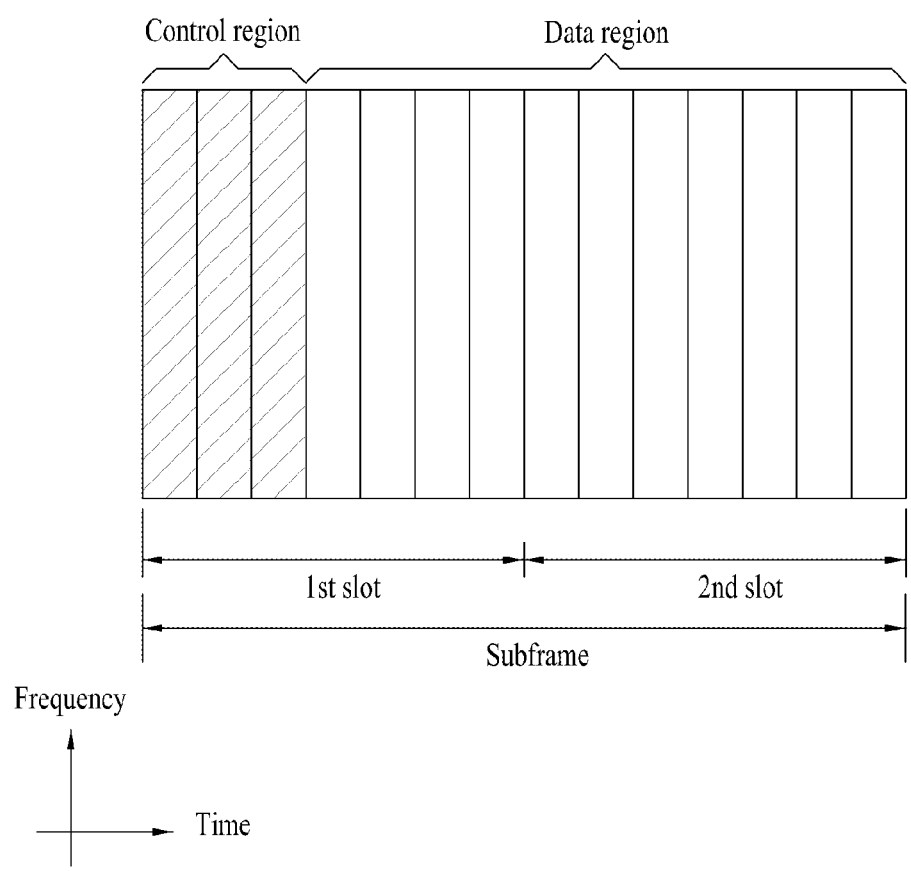
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The size and purpose of DCI carried on a PDCCH depend on DCI format and the size thereof may be varied according to coding rate.

A plurality of PDCCHs may be transmitted in a PDCCH region of a DL subframe. A UE may monitor the plurality of PDCCHs. A base station may determine DCI format based on DCI to be transmitted to the UE and attaches cyclic redundancy check (CRC) for error detection to the DCI. The CRC is masked with an identifier (for example, radio network temporary identifier (RNTI)) depending on owner or usage of the PDCCH. For example, if the PDCCH is for a specific user equipment, a unique identifier (for example, cell-RNTI (C-RNTI)) of the corresponding user equipment may be masked with the CRC. If the PDCCH is for a paging message, a paging identifier, for example, Paging-RNTI (P-RNTI) may be masked with the CRC. If the PDCCH is for system information transmitted through the DL-SCH, system information identifier, for example, system information RNTI (SI-RNTI) may be masked with the CRC. If the PDCCH is for a random access response, which is a response to transmission of a random access preamble of the UE, a random access RNTI (RA-RNTI) may be masked with the CRC. CRC masking includes XOR(exclusive OR) operating CRC and RNTI at bit level.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. Four QPSK symbols are mapped into one REG. A resource element (RE) allocated to the reference signal (RS) is not included in the REG. Accordingly, a total number of REGs within given OFDM symbols are varied depending on the presence of a cell-specific reference signal. The REG concept (that is, group unit mapping, each group includes four resource elements) is used for other downlink control channels (that is, PDFICH and PHICH). DCI format and a number of DCI bits is determined based on a number of CCEs.

CCEs are used by being numbered continuously. In order to simplify a decoding process, the PDCCH having a format that includes n number of CCEs may start from only CCE having a number equivalent to a multiple of n. The number of CCEs used for transmission of a specific PDCCH is determined by the base station in accordance with a channel condition. For example, if the PDCCH is for a user equipment having a good downlink channel (for example, adjacent to BS), one CCE may be required. However, in case of a user equipment having a poor channel (for example, adjacent to the cell edge), eight CCEs may be used to obtain sufficient robustness.

Figure 4:
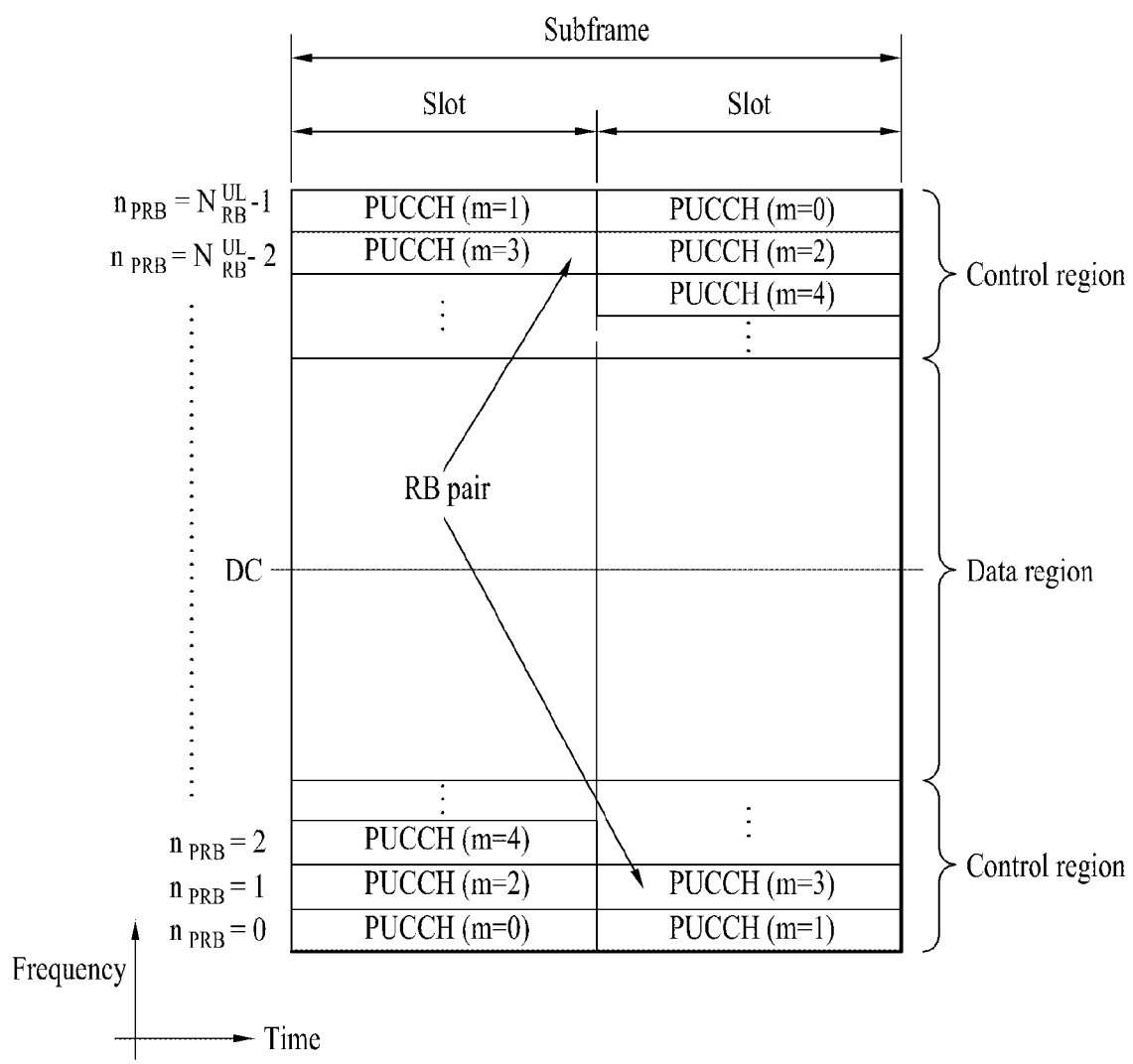
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted in a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of the PUCCH and the PUSCH may be indicated by higher layers.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The quantity of control information (UCI) that a UE can transmit through a subframe depends on the number of SC-FDMA symbols available for control information transmission. For example, PUCCH format will be defined as follows:

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
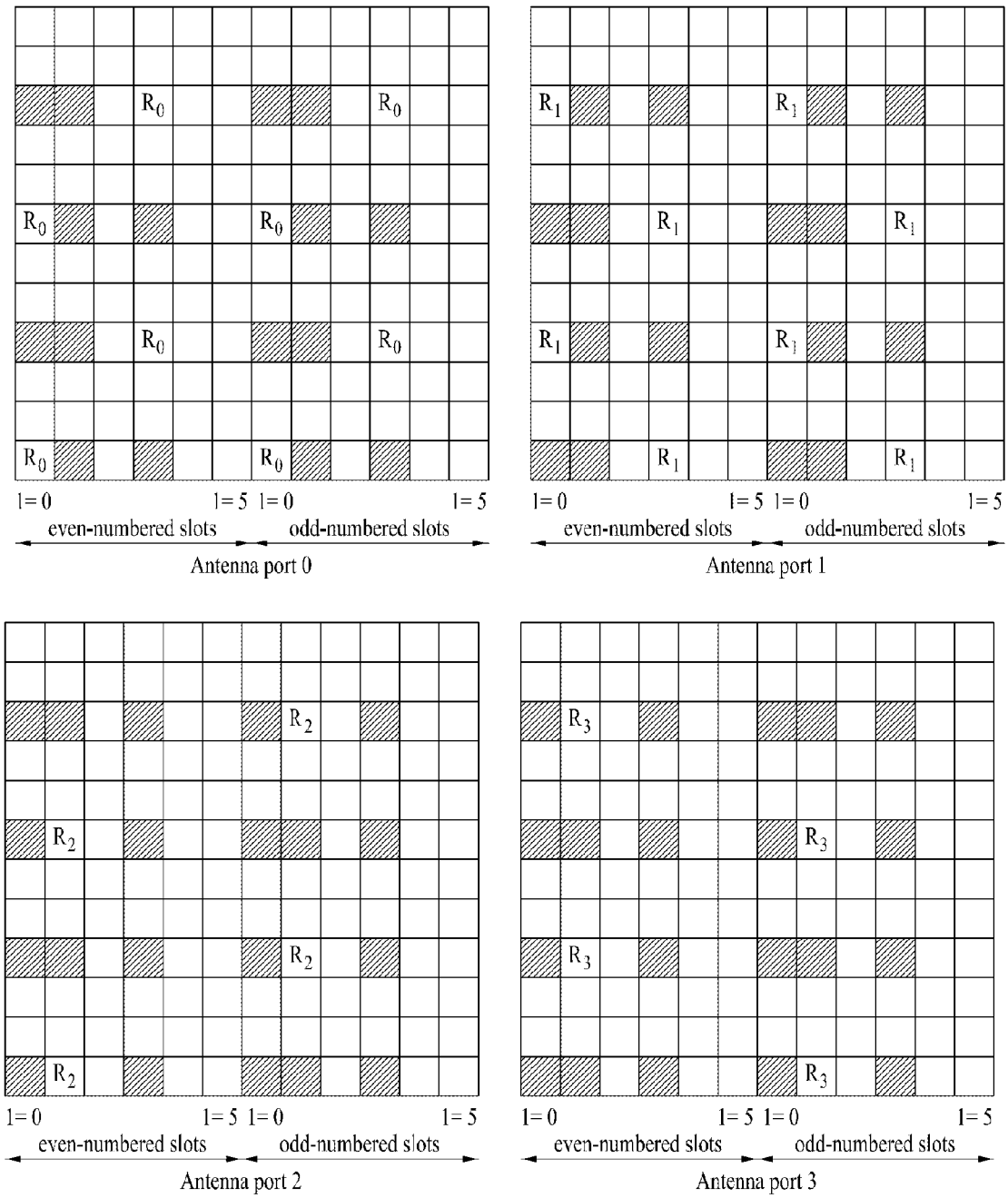
FIG. 5 exemplarily shows mapping patterns of a cell-specific reference signal according to antenna ports.

FIG. 5 shows a CRS (cell-specific reference signal) mapping pattern in connection with antenna port(s). The CRS is used for obtaining channel information and modulating data while UE-specific reference signal is used only for modulating data. The CRS is transmitted in every subframe for wideband and for up to 4 antenna ports depending on the number of the transmission antennas of the eNB.

For example, if the number of the transmission antennas of the eNB is 2, the CRS is transmitted for antenna ports #0 and #1, and if the number of the transmission antennas of the eNB is 4, the CRS is transmitted for antenna ports #0 to #3

FIG. 6 shows a DM-RS (demodulation-reference signal) pattern. The DM-RS is defined for the UE to estimate channel for PDSCH. The DM-RS may be used in transmission mode 7, 8 and 9. Initially, the DM-RS is defined for antenna port #5 for single layer transmission, it is extended for spatial multiplexing of up to 8 layers. The DM-RS is, as it can be seen from its another name, UE-specific RS, transmitted for a specific UE, thus the DM-RS is transmitted in resource block (RB) on which PDSCH for the specific UE is transmitted.

A wireless communication system such as 3GPP LTE supports a UE-specific RS, to which the same precoding method as in data is applied, to be utilized for channel estimation, such that it can support UEs that can receive precoded data in a PDSCH region. For example, the LTE Rel-8 system transmits a UE-specific RS for a UE configured to receive beam forming data through an antenna port #5. The LTE Rel-9 system transmits a UE-specific RS through antenna ports #7 and #8 discriminated by a Walsh code having a length of 2 so as to support either transmission of two spatial layers for a single UE or MU (Multi-User)-MIMO transmission in which each of two UEs utilizes a single beam. A UE-specific RS for use in Rel-9 is extended to a DM-RS for use in LTE Rel-10. The DM-RS is identified by a Walsh code having a length of 2 or 4, and supports the MIMO scheme that is capable of using 8 spatial layers using a maximum of 8 antenna ports #7 to #14. The generating of DM-RS for up to 8 spatial layers will be described now.

DM-RS is generated using $N_{ID}^{cell}$ indicating a physical layer cell identifier as a seed. For example, for antenna ports $p \in \{7, 8, \ldots, \gamma+6\}$, DM RS may be defined by the following Equation 1.

$$r(m) = \frac{1}{\sqrt{2}}(1 - 2 \cdot c(2m)) - j\frac{1}{\sqrt{2}}(1 - 2 \cdot c(2m-1)), \quad [\text{Equation 1}]$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Equation 1, $N_{RB}^{max,DL}$ is the largest downlink bandwidth configuration, and may be denoted by an integer multiple of $N_{sc}^{RB}$. Here, a pseudo-random sequence c(i) may be defined by a length-31 Gold sequence. An output sequence c(n) (where n=0, 1, . . . , $M_{PN-1}$) having a length of $M_{PN}$ is defined according to the following equation 2.

$c(n)=(x_1(n+N_C)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$  [Equation 2]

Here, $N_C$=1600 and a first m-sequence is initialized to $x_1(0)$=1, $x_1(n)$=0, n=1, 2, . . . , 30. Initialization of a second m-sequence is represented by the following Equation 3 having a value depending on application of the sequence.

$c_{init}=\Sigma_{i=0}^{30}x_2(i)\cdot 2^i$  [Equation 3]

In Equation 1, a pseudo-random sequence generator is initialized to $c_{init}$ at the beginning of each subframe according to the following Equation 4.

$c_{init}=(\lfloor n_s/2 \rfloor+1)\cdot(2N_{ID}^{cell}+1)\cdot 2^{16}+n_{SCID}$  [Equation 4]

In Equation 4, if $n_{SCID}$ is not specified, $n_{SCID}$ is set to zero. For PDSCH transmission on Antenna Port 7 or 8, $n_{SCID}$ is given by DCI format 2B or 2C related to PDSCH transmission. DCI format 2B is a DCI format for resource assignment for a PDSCH that uses a maximum of two antenna ports each having a DM RS, and DCI format 2C is a DCI format for resource assignment for a PDSCH that uses a maximum of 8 antenna ports each having a DM RS. In case of DCI format 2B, $n_{SCID}$ may be indicated by a scrambling ID field according to Table 3. In case of DCI format 2C, $n_{SCID}$ may be indicated by a scrambling ID field according to Table 4.

TABLE 3

| Scrambling identity field in DCI format 2B | $n_{SCID}$ |
|---|---|
| 0 | 0 |
| 1 | 1 |

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Referring to Equations 1 to 4, when the eNB generates a DM-RS to be transmitted to a specific cell, the eNB applies the same physical layer cell ID $N_{ID}^{cell}$ to all UEs. In the 3GPP LTE(-A) system, one UE receives a DL signal in only one cell, such that the UE needs to recognize one $N_{ID}^{cell}$ and one $n_{SCID}$ to detect its own DM-RS. Referring to Equation 4, UEs located in one cell may initialize a pseudo-random sequence generator configured to the RS sequence using the same $N_{ID}^{cell}$. From the viewpoint of one UE, the UE receives a DL signal from only one cell, such that the UE uses only one $N_{ID}^{cell}$ to generate a DM-RS. That is, a UE for use in the conventional system receives a DL signal in only one cell, such that the UE can use a cell DL—based DM-RS sequence. In other words, since a downlink (DL) cell and an uplink (UL) cell are identical to each other in the conventional communication system and UL/DL transmission is performed in only one cell in the conventional communication system, the UE obtains $N_{ID}^{cell}$ on the basis of downlink (DL) synchronization signals (i.e., Primary Synchronization Signal (PSS) and Secondary Synchronization Signal (SSS)) received from the serving cell, and uses the obtained $N_{ID}^{cell}$ to generate UL/DL RS sequences.

However, under the DL CoMP situation, a plurality of cells or transmission points (TPs) may simultaneously participate in transmission of a DL signal for one UE, or may also selectively transmit a DL signal to the UE. For example, one of two points may perform DL data transmission (e.g., PDSCH transmission) or the other point may perform no transmission of DL data (in case of CB/CS or DPS). In another example, two points may perform DL data transmission (in case of JT). In addition, under the UL CoMP situation, one UE may perform UL transmission for a plurality of cells or reception points (RPs) or may also perform UL transmission for the plurality of cells or some of RPs. In this case, assuming that a transmitter transmits an RS sequence generated on the basis of $N_{ID}^{cell}$ of the legacy serving cell according to the conventional scheme, a receiver may not detect the corresponding RS sequence.

In Equation 1, $N_{ID}^{cell}$ is used as a variable for obtaining the interference randomization effect by allocating different DM-RS sequences acting as cell IDs to contiguous cells, and $n_s$ is a variable that randomizes correlation with a contiguous cell DM-RS sequence using a slot number within one radio frame. In addition, $n_{SCID}$ is a variable that quasi-orthogonally supports a maximum of two UEs other than two MU-MIMO UEs through an orthogonal cover code (OCC) based on Walsh codes within the same cell. However, the LTE-A has recently considered DM-RS sequence assignment that is not cell-specifically defined to support the CoMP scheme.

Figure 7:
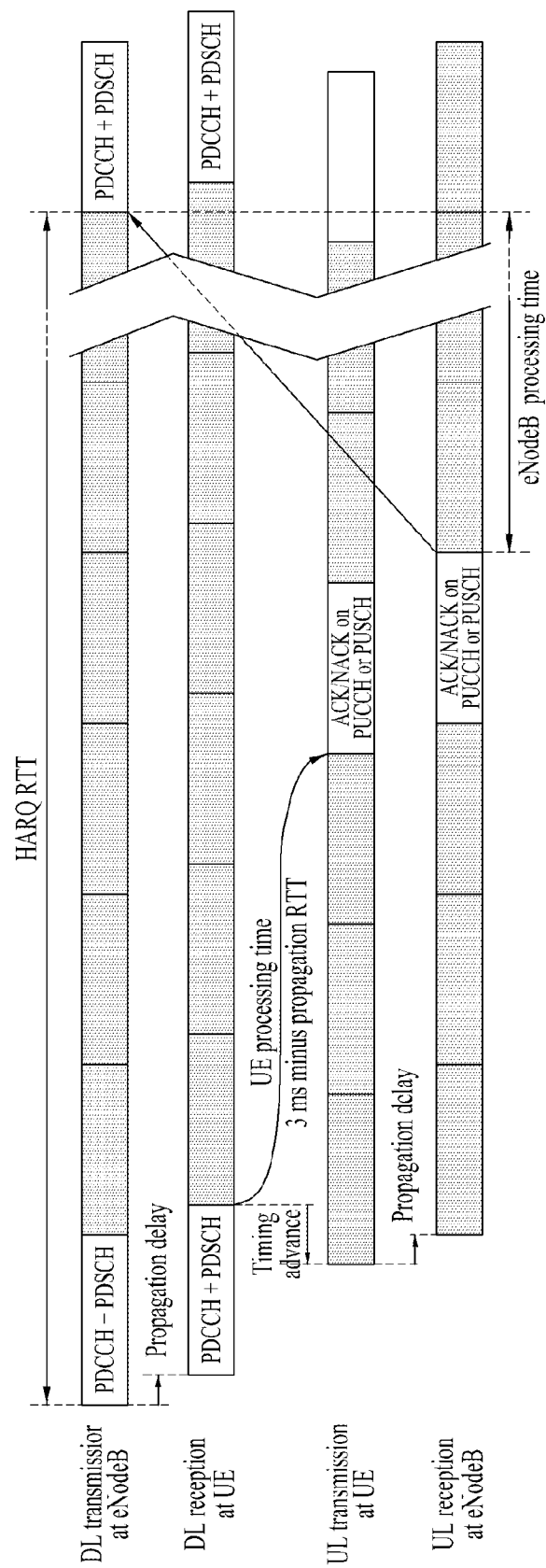
FIG. 7 exemplarily shows a downlink HARQ process for use in an LTE FDD system.
Figure 8:
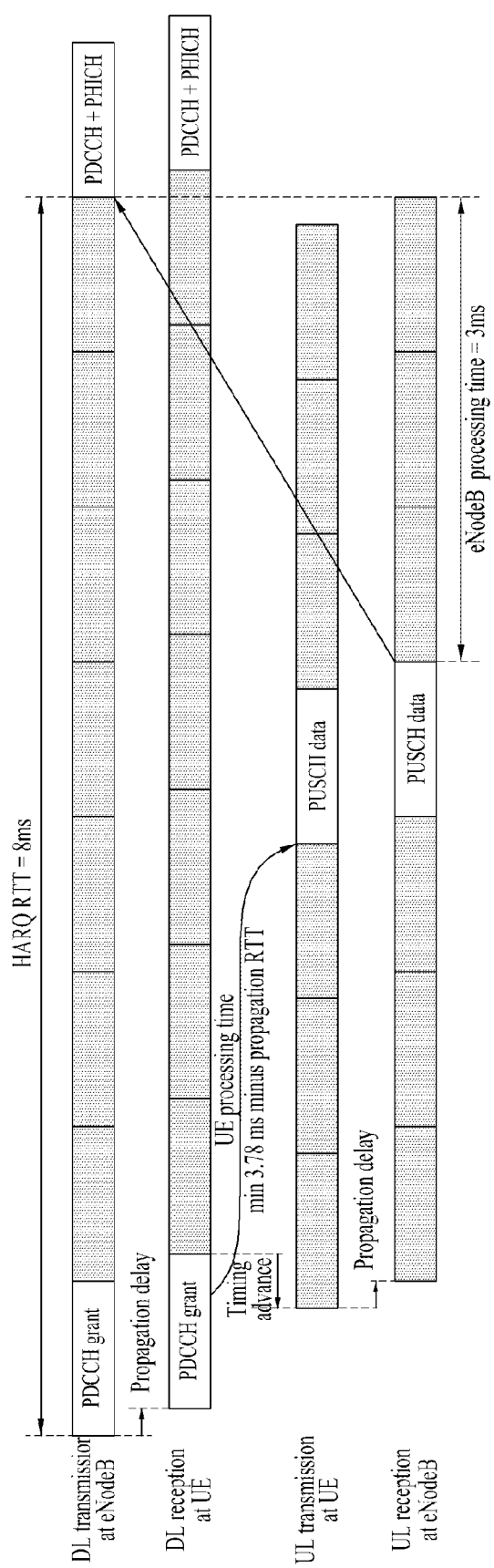
FIG. 8 exemplarily shows an uplink HARQ process for use in an LTE FDD system.

FIG. 7 is a diagram illustrating a downlink HARQ process in an LTE FDD system, and FIG. 8 is a diagram illustrating an uplink HARQ process in an LTE FDD system.

In the LTE FDD system, eight Stop-And-Wait (SAW) HARQ processes are supported on both the uplink and the downlink in accordance with a constant round-trip time (RTT) of 8 ms.

The respective HARQ processes are defined by a unique HARQ process identifier of 3 bit size, and individual soft buffer allocation for combination of retransmitted data is required for a reception end (that is, UE at the downlink HARQ process, and eNodeB at the uplink HARQ process). Also, in the LTE system, it is defined that information such as a new data indicator (NDI), a redundancy version (RV) and a modulation and coding scheme (MCS) level is signaled to the reception end.

In the meantime, the downlink HARQ process of the LTE system is an adaptive asynchronous scheme. Accordingly, downlink control information for the HARQ process is explicitly accompanied per downlink transmission. On the other hand, the uplink HARQ process of the LTE system is a synchronous scheme, and may be performed adaptively or non-adaptively. Since the uplink non-adaptive HARQ scheme does not accompany signaling of explicit control information, sequence such as previously set RV sequence, that is, 0, 2, 3, 1, 0, 2, 3, 1, . . . is required for continuous packet transmission. However, according to the uplink adaptive HARQ scheme, RV is signaled explicitly.

Figure 9:
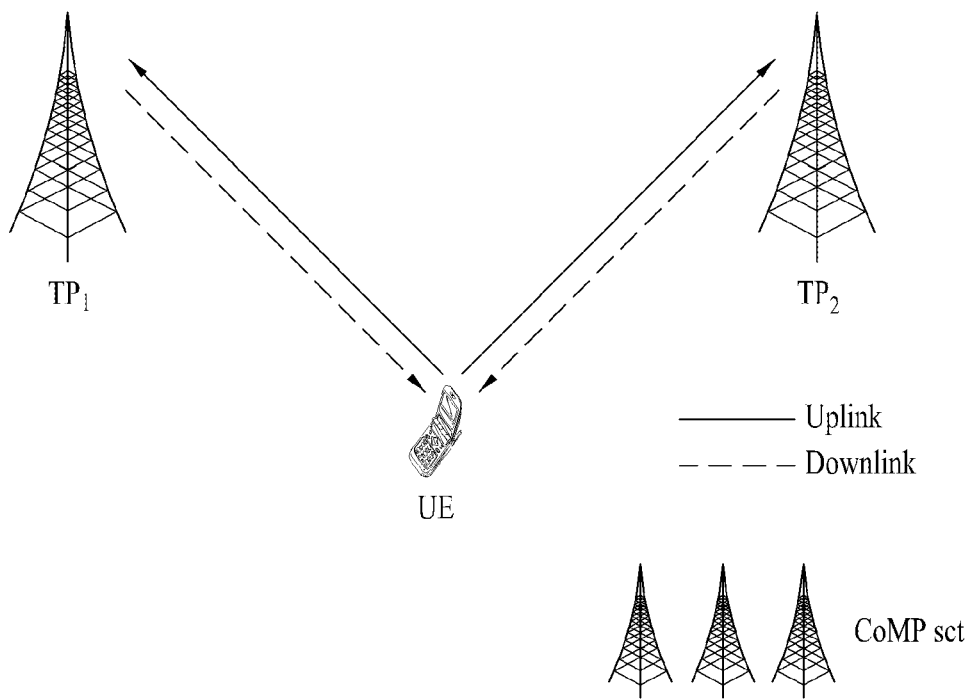
FIG. 9 is a conceptual diagram illustrating a Coordinated Multiple Point (CoMP) transmission/reception aggregate related to an embodiment of the present invention.

FIG. 9 is a conceptual diagram illustrating a wireless communication system for enabling a UE to receive a joint transmission (JT) service from the CoMP aggregate. In FIG. 9, the UE may be set to a Tx mode 10. Various downlink operations related to the CoMP aggregate may be implemented by the JT scheme, a dynamic cell selection (DPS) scheme, and a coordinated scheduling/beamforming (CS/CB) scheme. In FIG. 9, all transmission points (TPs) contained in the CoMP aggregate may receive data from some transmission points (TP1, TP2), such that the UE may transmit channel status information (CSI) of all TPs contained in the CoMP aggregate. In addition, the UE may receive some downlink signals (e.g., PDCCH) from TP1, and may receive the remaining downlink signals (e.g., PDSCH) from TP2. In this case, there is a need to generate a DMRS sequence for each TP. As such, the present invention proposes a method for performing DMRS sequence allocation instead of using a method for cell-specifically performing DMRS sequence allocation.

First Embodiment

A first embodiment can dynamically indicate a seed value for more effectively generating the DMRS sequence in various ways. In general, the present invention proposes a method for implicitly combining one virtual cell identifier with each HARQ ID using a hybrid automatic repeat/retransmission request (HARQ) process identifier (hereinafter referred to as HARQ ID) having a width of 3 bits (for FDD) or 4 bits (for FDD) present in all downlink control information (DCI) formats, such that the UE can generate a downlink (DL) DMRS sequence using the virtual cell ID implicitly associated with the corresponding HARQ ID upon receiving a DL grant for the use of a specific HARQ ID through the corresponding DCI, and thus the DL DMRS sequence can be used for PDSCH reception. That is, the HARQ ID contained in DCI may be considered seed-value indication information for DMRS sequence generation. This seed-value indication information may indicate not only information indicating HARQ ID but also other information indicating HARQ ID contained in DCI.

In case of frequency division duplex (FDD), for example, a HARQ ID is 3 bits long. That is, 8 HARQ IDs may be used, and 8 virtual cell IDs may be given to the UE through higher layer signaling in advance. This means that a maximum of 8 different DMRS sequences can be generated, and DM CoMP data can be received from a maximum of 8 TPs (or TP groups). However, a maximum of 8 virtual cell IDs is provided to the UE through higher layer signaling. If the respective virtual cell IDs are associated with different HARQ IDs on a one to one basis (i.e., the virtual cell IDs are mapped to different HARQ IDs, respectively), there is a disadvantage in that PDSCH transmitted along with a DMRS acting as a specific virtual cell ID can be transmitted only through one HARQ process.

Therefore, under the condition that a small number of virtual cell ID(s) is provided to the UE through higher layer signaling in advance, it is preferable that each virtual cell ID be associated with the respective virtual cell IDs (i.e. 1-to-n mapping). The embodiment of the present invention provides a method for providing the UE with the mapping (or association) relationship between a specific virtual cell ID and specific HARQ ID(s) in advance. That is, the embodiment of the present invention provides a method for providing the UE with the list of candidate seeds for DMRS sequence generation corresponding to the mapping (or association) relationship between a specific virtual cell ID and specific HARQ ID(s).

Through information regarding the mapping (or association) relationship, the UE may generate a DL DMRS sequence using the virtual cell ID associated with the corresponding HARQ ID upon receiving a DL grant or DCI including a specific HARQ ID, such that the UE may use the DL DMRS for PDSCH demodulation. In addition, higher layer signaling (or MAC CE signaling) for activating or deactivating the above mode may also be applied to the above embodiment.

Figure 10:
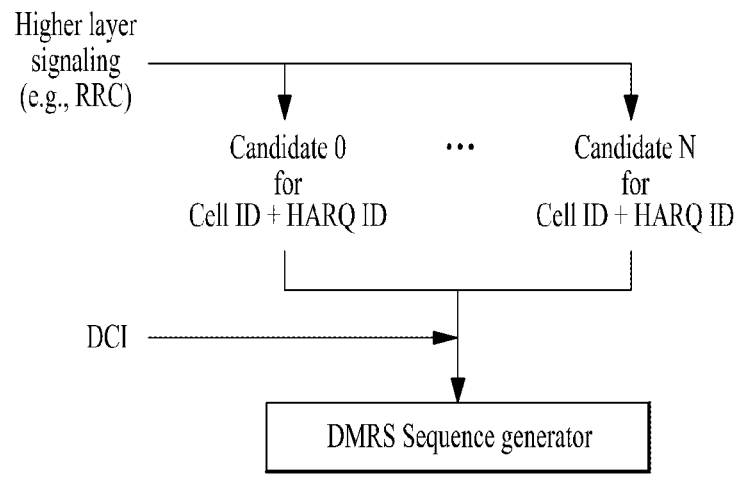
FIG. 10 is a conceptual diagram illustrating a DMRS sequence generation or allocation operation related to an embodiment of the present invention.

FIG. 10 is a conceptual diagram illustrating a DMRS sequence generation or allocation operation related to an embodiment of the present invention. That is, virtual cell ID information related to HARQ ID, i.e., all of the list of candidate seeds for DMRS sequence generation, may be signaled through higher layer signaling (e.g., RRC signaling), and the number (N) of virtual cell IDs and HARQ ID combinations may be identical to a total number of HARQ IDs. In other words, in case of FDD, N may be set to 8 (i.e., N=8). Of course, N may also be changed to another value as necessary. The 1-to-n mapping can more efficiently support necessary operations as compared to the 1-to-1 mapping between the virtual cell ID and the HARQ ID. Thereafter, when the UE receives the DL grant from the BS (or eNB) through a specific DCI, the UE may generate a DL DMRS sequence using the virtual cell ID related to the HARQ ID through the HARQ ID (or number) of the corresponding DCI format.

Second Embodiment

The above-mentioned first embodiment has a disadvantage in that the XO may be no longer signaled to the UE on the condition that all HARQ IDs related to a virtual cell ID (e.g., XO) are allocated to the UE. Accordingly, the second embodiment of the present invention provides another method applicable to the above situation. In more detail, according to the second embodiment, if all the HARQ ID(s) (e.g., HARQ ID 0 to HARQ ID 3) related to a specific virtual cell ID are being operated (e.g., assuming that a total number of 4 HARQ IDs related to the virtual cell ID (e.g., XO) is set to 4, when all of 3 HARQ IDs are also operating, the last HARQ ID (i.e., the fourth HARQ ID) is received as a new DCI), and when another new DL grant including the remaining HARQ ID(s) (i.e., HARQ ID(s) related to another virtual cell ID (e.g., XI)) (e.g., HARQ IDs 4 to 7) is received after lapse of specific subframe(s), '0' or '1' corresponding to 1 bit indicating other information contained in DCI (e.g., the scrambling identify (SCID)) can be interpreted as follows. Other information contained in DCI may be designated as seed-value indication auxiliary information.

SCID '0': PDSCH demodulation may generate a DL DMRS sequence using the virtual cell ID related to all of the operating HARQ ID(s) so that PDSCH demodulation is carried out.

SCID '1': DL DMRS sequence is generated using the virtual cell ID related to the remaining HARQ IDs so that PDSCH demodulation is carried out.

That is, if SCID is set to zero 0, a DL DMRS sequence is generated using the virtual cell ID related to the operating HARQ ID(s) (e.g., HARQ IDs 0 to 3), the present invention can provide flexible scheduling in a manner that PDSCH transmission can be continuously achieved through the virtual cell ID. If the SCID is set to 1, the virtual cell ID related to the remaining HARQ IDs is used without change, and the original purpose in which the virtual cell ID related to each HARQ ID(s) is dynamically selected to perform the CoMP operation can be flexibly established according to the selection of a scheduler (e.g., eNB or system).

In the meantime, the above-mentioned interpretation of SCIDs 0 and 1 is disclosed only for illustrative purposes. In the second embodiment, according to the mapping scheme in which bits indicating the HARQ ID of the corresponding DCI are predefined when the DL grant related to a specific virtual cell ID for each HARQ ID is received, the DL DMRS sequence can be generated using the specific virtual cell ID. In addition, the DL DMRS sequence is generated using the virtual cell ID according to the above mapping rule. When using a new DL grant received through another HARQ ID when all the HARQ ID(s) related to the specific virtual cell ID are operating, specific information (i.e., SCID bit value in the above description) contained in another DCI is interpreted in a manner that the virtual cell ID related to all of the operating HARQ ID(s) can be additionally used to generate the DMRS sequence, so that it is possible to obviate the conventional problem in which the virtual cell ID related to the corresponding HARQ ID(s) related to the specific virtual cell ID cannot be used to generate the DMRS sequence. In the above description, although information for dynamic allocation of the virtual cell ID is exemplarily shown as SCID, other information contained in DCI or various information capable of being received by the UE may be used as the above dynamic allocation information. For example, the other scheme in which PDSCH RE mapping and Quasi-colocation indicator (PQI) bits of DCI format 2D can be re-interpreted can also be applied to this embodiment.

In other words, the second embodiment may include the above method for additionally interpreting the SCID bits, various similar methods, and other methods for interpreting other DCI bits, and may also include all methods in which the virtual cell ID related to the corresponding HARQ ID(s) can be used to generate additional DMRS sequences.

Third Embodiment

In another embodiment of the present invention, the method for dynamically allocating or generating the DMRS sequence through the virtual cell ID related to the HARQ ID can also be applied not only to DCI format 2C for transmitting the DMRS based PDSCH, but also to other DCI formats for transmitting the CRS based PDSCH, and a detailed description thereof will hereinafter be described.

In association with DCI formats (e.g., DCI formats 1A, 1, 1B, 1D, 2, and 2A) for transmitting the CRS based PDSCH, specific HARQ ID(s) are associated with the respective physical cell identifiers (PCIDs) corresponding to a seed value of the CRS sequence for CRS detection required when the UE receives the corresponding PDSCH, and the PCID-to-HARQ ID(s) association or mapping information may be provided to the UE through higher layer signaling. That is, all of the candidate seed lists needed for CRS sequence generation may be applied to the UE.

Thereafter, when specific DCI formats (DCI formats 1A, 1, 1B, ID, 2, 2A) based on CRS are detected, the UE may generate a CRS sequence using the specific PCID value related to the HARQ ID(s) contained in the corresponding DCI format, so that the UE can decode or demodulate the PDSCH. That is, CoMP such as a CRS-based DPS (dynamic point selection) may be implemented. That is, the UE configured to perform the above operation can detect the DCI through the CRS generated as the serving cell PCID, and actual PDSCH demodulation may be carried out through the CRS that has been generated using other PCIDs related to the HARQ ID of the DCI.

Figure 11:
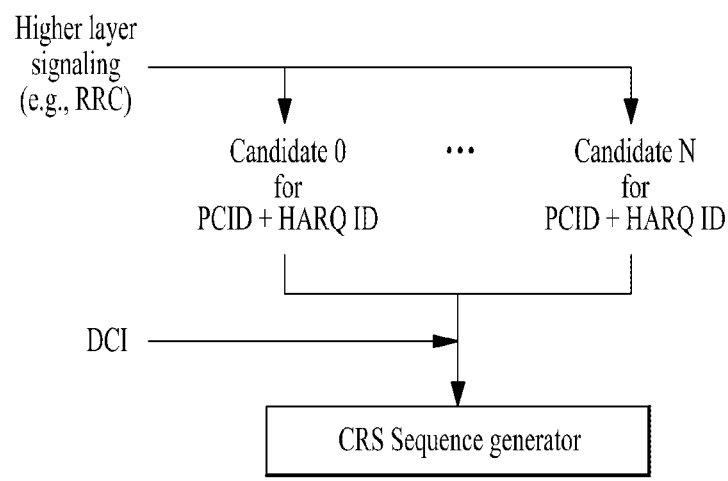
FIG. 11 is a conceptual diagram illustrating a CRS sequence generation or allocation operation related to an embodiment of the present invention.

FIG. 11 is a conceptual diagram illustrating a CRS sequence generation or allocation operation related to an embodiment of the present invention. Referring to FIG. 11, PCID information related to HARQ ID may be signaled through higher layer signaling (e.g., RRC signaling), and the number (N) of PCID and HARQ ID candidates may be identical to a total number of HARQ IDs. In case of FDD, N may be set to 8 (N=8). Of course, N may also be set to another value as necessary. The 1-to-n mapping scheme can support more flexible operations as compared to the 1-to 1 mapping scheme of PCID and HARQ ID in a similar way to the above-mentioned DMRS sequence allocation. Thereafter, when the CRS based DL grant is received through a specific DCI, the CRS sequence is generated using the PCID related to the HARQ ID information through the HARQ ID information of the corresponding DCI format, so that the corresponding PDSCH demodulation can be carried out.

Figure 12:
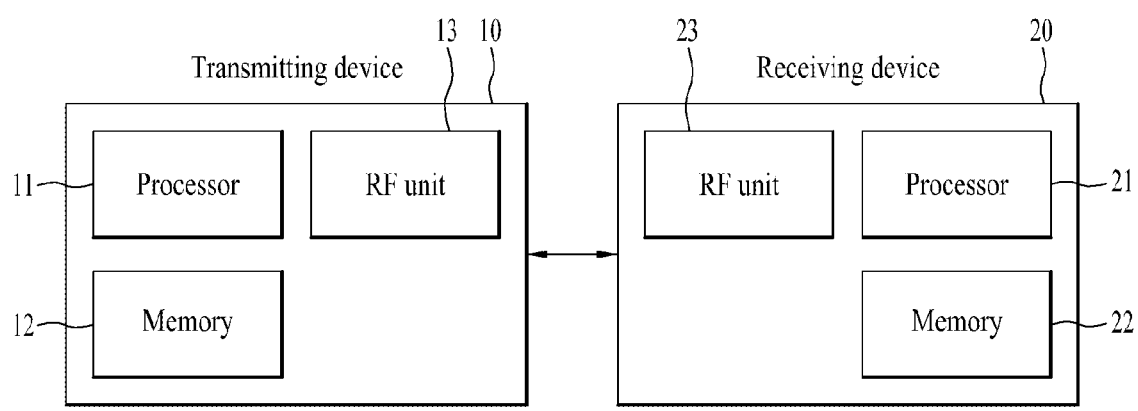
FIG. 12 is a block diagram illustrating an exemplary device applicable to the embodiment(s) of the present invention.

FIG. 12 is a block diagram illustrating configurations of a transmitter 10 and a receiver 20 implementing the embodiments of the present invention.

The transmitter 10 and the receiver 20 respectively include radio frequency (RF) units 13 and 23 capable of transmitting or receiving radio signals carrying information and/or data, signals, messages, etc., memories 12 and 22 storing information related to communication in a wireless communication system, processors 11 and 21 operably connected to the RF units 13 and 23 and the memories 12 and 22 and configured to control the memories 12 and 22 and/or the RF units 13 and 23 such that the transmitter 10 and the receiver 20 implement at least one of the above-described embodiments of the present invention.

The memories 12 and 22 can store programs for processing and control of the processors 11 and 21 and temporarily store input/output information. The memories 12 and 22 can be used as buffers.

The processors 11 and 21 control overall operations of internal modules of the transmitter 10 and the receiver 20 in general. Particularly, the processors 11 and 21 can execute various control functions for implementing the present invention. The processors 11 and 21 may be called controllers, microcontrollers, microprocessors, microcomputers, etc. The processors 11 and 21 may be implemented by hardware, firmware, software, or combinations thereof. When the embodiments of the present invention are implemented using hardware, ASICs (Application Specific Integrated Circuits), DSPs (Digital Signal Processors), DSPDs (Digital Signal Processing Devices), PLDs (Programmable Logic Devices) or FPGAs (Field Programmable Gate Arrays) configured to implement the present invention may be included in the processors 11 and 21. In a firmware or software configuration, the embodiments of the present invention may be implemented in the form of a module, a procedure, a function, etc. Firmware or software configured to implement the present invention may be included in the processors 11 and 21 or stored in the memories 12 and 22 and executed by the processors 11 and 21.

The processor 11 of the transmitter 10 performs predetermined coding and modulation on a signal and/or data scheduled by the processor 11 or a scheduler connected to the processor 11 to be transmitted and transmits the signal and/or data to the RF unit 13. For example, the processor 11 converts data streams to be transmitted into K layers through demultiplexing, channel coding, scrambling and modulation. A coded data stream may be called a codeword and is equivalent to a transport block corresponding to a data block provided by the MAC layer. A transport block (TB) is coded into a codeword and each codeword is transmitted in the form of one or more layers to the receiver. The RF unit 13 may include an oscillator for frequency up-conversion. The RF unit 13 may include Nt (Nt being a positive integer greater than 1) transmit antennas.

A signal processing procedure of the receiver 20 is reverse to the signal processing procedure of the transmitter 10. The RF unit 23 of the receiver 20 receives a radio signal transmitted from the transmitter 10 under the control of the processor 21. The RF unit 23 may include Nr reception antennas and frequency-down-converts signals received through the reception antennas into baseband signals. The RF unit 23 may include an oscillator for frequency down-conversion. The processor 21 can decode and demodulate radio signals received through the reception antennas to restore data that the transmitter intended to transmit.

Each of the RF units 13 and 23 includes one or more antennas. The antennas transmit signals processed by the RF units 13 and 23 to the outside or receive external radio signals and transfer the received signals to the RF units 13 and 23 under the control of the processors 11 and 21 according to an embodiment of the present invention. The antennas may be called antenna ports. Each antenna may correspond to a physical antenna or may be configured using a combination of one or more physical antenna elements. A signal transmitted from each antenna cannot be decomposed by the receiver 20. An RS transmitted corresponding to a specific antenna defines the specific antenna with respect to the receiver 20 and enables the receiver 20 to perform channel estimation for the antenna irrespective of a single radio channel from a physical antenna or a composite channel from a plurality of physical antenna elements. That is, an antenna is defined such that a channel on which a symbol on the antenna is transferred can be derived from a channel on which a different symbol on the same antenna is transferred. An RF unit supporting MIMO which transmits data using a plurality of antennas can be connected to two or more antennas.

In the embodiments of the present invention, the UE operates as the transmitter 10 on uplink and operates as the receiver 20 on downlink. In the embodiments of the present invention, the eNB operates as the receiver 20 on uplink and operates as the transmitter 10 on downlink.

The transmitter and/or the receiver can perform at least one combination of the above-described embodiments of the present invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication devices such as a UE, a relay, an eNB, etc.

The invention claimed is:

1. A method for receiving, by a user equipment (UE), a downlink signal in a wireless communication system, the method comprising:
receiving a list of a plurality of virtual cell identifiers and information of a mapping relationship between the plurality of virtual cell identifiers and a plurality of hybrid automatic repeat request (HARQ) process identifiers from a base station (BS);
receiving downlink control information (DCI) including a specific HARQ process identifier among the plurality of HARQ process identifiers from the BS;
selecting a specific virtual cell identifier from the plurality of virtual cell identifiers based on the mapping relationship and the specific HARP process identifier included in the DCI; and
generating a sequence of a downlink demodulation reference signal (DM RS) using the specific virtual cell identifier.

2. The method according to claim 1, wherein the mapping relationship indicates that each of the HARQ process identifiers corresponds to each of the virtual cell identifiers.

3. The method according to claim 1, wherein the mapping relationship indicates that at least two HARQ process identifiers from the plurality of HARQ process identifiers correspond to the specific virtual cell identifier.

4. The method according to claim 1, wherein the selecting the specific virtual cell identifier includes:
if all HARQ process identifiers mapped to the specific virtual cell identifier are allocated so that the specific virtual cell identifier is no longer allocated to the UE, the selection of the specific virtual cell identifier is further based on auxiliary information included in the DCI.

5. The method according to claim 4, wherein the auxiliary information is scrambling identity information.

6. A method for transmitting, by a base station, a downlink signal in a wireless communication system, the method comprising:
transmitting a list of a plurality of virtual cell identifiers and information of a mapping relationship between the plurality of virtual cell identifiers and a plurality of hybrid automatic repeat request (HARQ) process identifiers to a user equipment (UE); and
transmitting downlink control information (DCI) including a specific HARQ process identifier among the plurality of HARQ process identifiers to the UE,
wherein the UE selects a specific virtual cell identifier from the plurality of virtual cell identifiers based on the mapping relationship and the specific HARQ process identifier included in the DCI, and generates a sequence of a downlink demodulation reference signal (DM RS) using the specific virtual cell identifier.

7. A user equipment (UE) configured to receive a downlink signal in a wireless communication system, the UE comprising:
a radio frequency (RF) unit; and
a processor configured to control the RF unit,
wherein the processor is further configured to:
receive a list of a plurality of virtual cell identifiers and information of a mapping relationship between the plurality of virtual cell identifiers and a plurality of hybrid automatic repeat request (HARQ) process identifiers from a base station (BS),
receive downlink control information (DCI) including a specific HARQ process identifier among the plurality of HARQ process identifiers from the BS,
select a specific virtual cell identifier from the plurality of virtual cell identifiers based on the mapping relationship and the specific HARQ process identifier included in the DCI, and
generate a sequence of a downlink demodulation reference signal (DM RS) using the specific virtual cell identifier.

8. The user equipment (UE) according to claim 7, wherein the mapping relationship indicates that each of the HARQ process identifiers corresponds to each of the virtual cell identifiers.

9. The user equipment (UE) according to claim 7, wherein the mapping relationship indicates that at least two HARQ process identifiers from among the plurality of HARQ process identifiers correspond to the specific virtual cell identifier.

10. The user equipment (UE) according to claim 7, wherein:
when the processor selects the specific virtual cell identifier, if all HARQ process identifiers mapped to the specific virtual cell identifier are allocated so that the specific virtual cell identifier is no longer allocated to the UE, the processor is configured to select the specific virtual cell identifier further based on auxiliary information included in the DCI.

11. The user equipment (UE) according to claim 10, wherein the auxiliary information is scrambling identity information.

12. A base station (BS) configured to transmit a downlink signal in a wireless communication system, the BS comprising:
a radio frequency (RF) unit; and
a processor configured to control the RF unit,
wherein the processor is further configured to:
transmit a list of a plurality of virtual cell identifiers and information of a mapping relationship between the plurality of virtual cell identifiers and a plurality of hybrid automatic repeat request (HARQ) process identifiers to a user equipment (UE), and transmit downlink control information (DCI) including a specific HARQ process identifier among the plurality of HARQ process identifiers to the UE through the RF unit, wherein the UE is configured to select a specific virtual cell identifier from the plurality of virtual cell identifiers based on the mapping relationship and the specific HARQ process identifier included in the DCI, and generate a sequence of a downlink demodulation reference signal (DM RS) using the specific virtual cell identifier.

* * * * *